United States Patent [19]

Hébert

[11] Patent Number: 4,779,502

[45] Date of Patent: Oct. 25, 1988

[54] WIRE ROPE CUTTING TOOL

[75] Inventor: Edward E. Hébert, Mont-Laurier, Canada

[73] Assignee: Gestion Hego Inc., Québec, Canada

[21] Appl. No.: 32,528

[22] Filed: Apr. 1, 1987

[30] Foreign Application Priority Data

Oct. 2, 1986 [CA] Canada .................................. 519651

[51] Int. Cl.⁴ .............................................. B26D 5/12
[52] U.S. Cl. ....................................... 83/635; 30/228;
83/639; 83/694
[58] Field of Search .............. 83/639, 580, 694, 466.1,
83/635; 30/210, 272 R, 228, 273, 277

[56] References Cited

U.S. PATENT DOCUMENTS

| | | | |
|---|---|---|---|
| 2,236,833 | 4/1941 | Pell et al. | 83/694 X |
| 3,150,551 | 9/1964 | Spengler et al. | 83/694 X |
| 3,933,067 | 1/1976 | Clark | 83/928 X |
| 4,016,728 | 4/1977 | Mason | 83/639 X |
| 4,265,156 | 5/1981 | Stubbings | 83/694 X |
| 4,273,171 | 6/1981 | Spaulding, Sr. | 83/928 X |
| 4,369,576 | 1/1983 | McVaugh | 30/228 |

Primary Examiner—Frank T. Yost
Attorney, Agent, or Firm—Samuel Meerkreebs

[57] ABSTRACT

A wire rope cutter comprising a frame, a hydraulic cylinder and piston mounted on the frame. A piston rod extends from the hydraulic cylinder and mounts a wire cutting knife. An anvil is provided on the frame and in the axis of the piston rod. Means for mounting the frame on a support body are provided and the body includes a hydraulic circuit. The cylinder is in fluid communication with the hydraulic circuit on the body to thereby operate the piston and knife to advance towards the anvil for cutting a wire rope placed on the anvil.

5 Claims, 1 Drawing Sheet

U.S. Patent    Oct. 25, 1988    4,779,502
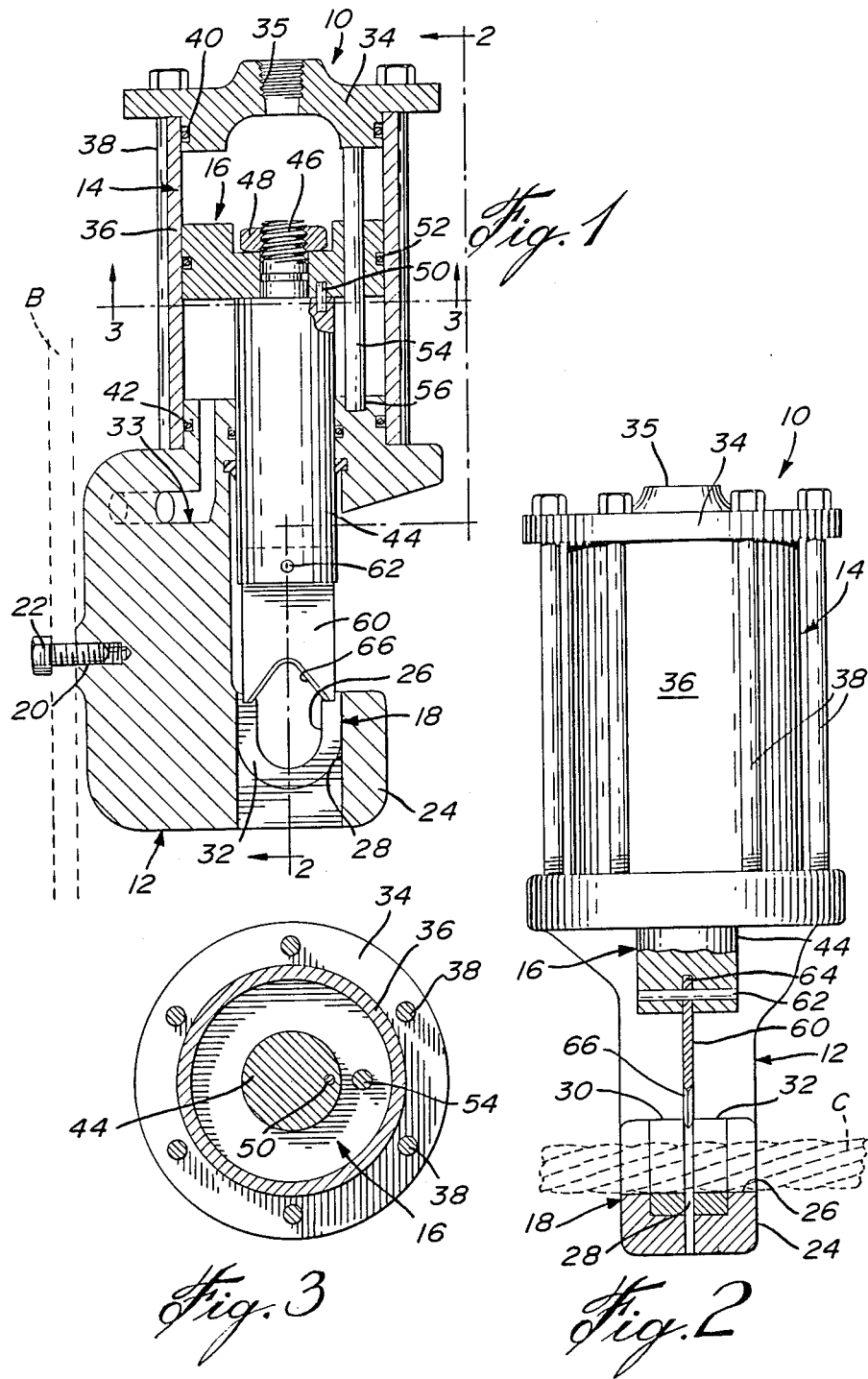

WIRE ROPE CUTTING TOOL

BACKGROUND OF THE INVENTION

1. Field of the invention

The present invention relates to a wire cutter and more particularly to a hydraulic wire rope cutter for use in the field.

2. Description of the Prior Art

Presently available wire cutters for use in the field are either manual scissors type cutters or portable hydraulic units utilizing a hand pump lever for operating the hydraulic cutting device. Such a hydraulic wire cutter must be self contained, that is, it must have its own oil reservoir, pump mechanism etc., and is thus cumbersome and heavy to carry around in the field.

Such tools are essential in logging operations. Wire ropes, which are used to drag logs over rough terrain, must be cut to specific size for use on a skidder. A skidder is a motorized vehicle usually mounted on large pneumatic tires or on tracks for dragging logs out of the tree cutting area to an area near a makeshift road where the logs may be shorn of its branches and are to be transported out of the forest. The logs are dragged by the skidder by means of a wire rope lasso. The cables wear out quickly and must be changed frequently. The use of a wire cutter for cutting wire rope is therefore essential in the circumstances. A hydraulic wire rope cutter is necessary in the light of the sometimes large diameter wire rope utilized.

SUMMARY OF THE INVENTION

It is an aim of the present invention to provide a hydraulic wire rope cutter for use in the field, which is practical to use as an accessory to existing hydraulic equipment being used. For instance, the hydraulic rope cutter can be used as an accessory to a skidder in a logging operation. In other words, the hydraulic wire rope cutter may be mounted to the body of the skidder and be connected to the hydraulic circuit of the skidder vehicle.

A construction in accordance with the present invention comprises a frame on which is mounted a hydraulic cylinder and piston having a wire cutting knife. An anvil is also provided on the frame in the axis of the piston. Means are provided for mounting the frame to a body, which body is provided with a hydraulic circuit. Means are provided for connecting the cylinder in fluid communication with the hydraulic circuit of the body whereby the piston and knife can be advanced toward the anvil for cutting a wire rope placed on the anvil.

It is also a feature of the present invention to provide a wire rope cutter comprising in particular, a hydraulic cylinder mounted on a frame and a piston mounting a wire cutting knife having a cutting edge and a pair of flat parallel surfaces. An anvil is provided on the frame aligned with the knife and adapted to provide a seat for the rope to be cut. The anvil includes a slot having a width corresponding to the width of the knife and adapted to receive the knife.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a vertical cross-section taken through a hydraulic wire rope cutter of the present invention.

FIG. 2 is a front elevation partly in cross-section taken along lines 2—2 of FIG. 1.

FIG. 3 is a horizontal cross-section taken through lines 3—3 of FIG. 1.

DESCRIPTION OF THE PREFERRED EMBODIMENTS

Referring now to the drawings, an embodiment of a hydraulic wire rope cutter 10 is shown, comprising a frame 12 and a cylinder 14 in which moves a piston 16 against an anvil 18.

The frame 12 is as shown, a cast of forged metal part having on the back thereof, threaded sockets 20 adapted to receive bolts 22, utilized when mounting the cutter 10 to a vehicle body B.

The frame 12 includes an anvil base 24 extending outwardly therefrom, defining a recess 26 for receiving a typical wire cable C to be cut. The wire rope C sits across the recess 26 as shown in FIG. 2. The base 24 is also provided with a slot 28 communicating with the recess 26 and open to the bottom of the anvil base 24 as will be described later. Hardened anvil pieces 30 and 32 are placed in the bottom of the recess 26 on either side of the slot 28 as shown in FIGS. 1 and 2. Finally, the frame is provided with a hydraulic outlet 33 which is adapted to communicate the cylinder 14 with the hydraulic circuit of body B (not shown).

The cylinder 14 includes a cylinder tube 36 which sits on the frame 12 and is held thereon by a cylinder head 34 which in turn is held on the cylinder tube 36 by means of bolts 38 passing through the cylinder head 34 and secured to the frame 12. O ring seals 40 are provided between the inner surface of the cylinder 14 and the cylinder head 34 while seal 42 is provided between the inner surface of the cylinder 36 and the frame 12.

The piston 16 is adapted to slide within the cylinder tube 36. A piston rod 44 is fixed at one end to the piston 16. The piston rod 44 includes a threaded neck 46 which passes through a bore in the center of the piston 16 and is fixed thereto by a nut 48. A keying pin 50 is provided between the rod 44 and the piston 16 in order to prevent the rod from rotating relative to the piston 16. A seal 52 is provided about the periphery of the piston 16 in order to prevent fluid leakage between the two chambers formed by the piston 16 in the cylinder 36.

The rod 54 extends parallel to the piston rod 44 and sits in a socket 56 in the frame 12 and at the other end thereof is fixed to the cylinder head 34. The rod 54 passes through a bore provided in the piston 16 in order to guide the piston and prevent it from rotating in the cylinder.

The other end of the piston rod 44 passes through the portion of the frame 12, forming the bottom of the cylinder 14, mounts a knife 60 fitted in a slot 64. A pin 62 retains the knife 60 to the end of the piston rod 44. The knife 60 has a pair of parallel flat sides and a V-shape knife edge 66.

In operation, the cutter 10 can be mounted for instance, to the side of a skidder body B. The cutter 10 is connected to the hydraulic circuit of the skidder B by connecting the hydraulic circuit (not shown) to the conduit 33 and inlet 35. If it is required to cut a wire rope C, the wire rope C is placed in the recess 26 of the base 24 and oil is permitted to enter the inlet 35 into the chamber formed by the piston 16 and the cylinder head 34 thus applying pressure on the piston 16, thereby moving piston rod 44 and knife 60 toward the anvil 18. As the knife 60 approaches the wire rope C in the recess 26, the V-shaped knife edge 66 engages the wire rope C and shears it against the anvil pieces 30 and 32. The knife 60 continues its path into the slot forming the anvil completely past the wire rope C through the wire rope. The wire rope C is contained within the recess 26 by the U-shape anvil pieces 30 and 32 as the V-shape knife squeezes and cuts right through the wire rope. Since the anvil pieces are U-shaped and have a semi-circular outline, the newly cut ends of the wire rope sustain the minimum damage as compared to a conventional wire cutter where the knife squashes the wire rope against a flat anvil. The pieces of wire rope which might have been sheared are cleared through the slot 28 at the bottom of the anvil base 24.

The hydraulic circuit is arranged such that the knife 60 is immediately retracted after having passed through a wire rope C so that it is ready to receive another piece within the anvil 18. From the construction of the knife blade in the anvil with the slot therein, it is important to insure that the knife blade is perfectly aligned with the slot 28 so as not to damage the knife 60 or the apparatus. Thus, the rod 54 is provided within the cylinder 14 in order to have the piston rod 44 aligned and to prevent the piston and the rod from rotating.

I claim:

1. A wire cutter comprising a frame, a hydraulic cylinder and piston mounted on the frame, a piston rod extending from the piston and through the hydraulic cylinder and mounting a wire-cutting knife, an anvil provided on the frame and in the axis of the piston rod, means for mounting the frame on a support body, which body includes a fluid-pressure circuit, means provided for connecting the cylinder in fluid commuication with the fluid circuit on the body to thereby operate and reciprocate the piston rod and knife to advance the knife toward the anvil for cutting a wire rope placed on the anvil, at least one guide rod anchored in the hydraulic cylinder and extending through the piston in spaced parallel relation to the piston rod and its path of movement, the knife is maintained and travels along the axis of the piston rod in a predetermined plane and the anvil is aligned with said axis.

2. A wire cutter as defined in claim 1, wherein the anvil is provided with a slot in the plane of the knife and the slot is adapted to receive the knife in its cutting stroke.

3. A wire cutter as defined in claim 1, wherein the anvil includes a wire rope receiving seat having a semi-circular shape and having an axis at right angles to the axis of the piston rod and knife, a slot defined in the anvil in the plane of the knife and at right angles to the anvil seat, the slot arranged such that when the knife is in its cutting stroke, it traverses the seat and enters the slot.

4. A wire cutter as defined in claim 3, wherein hardened anvil pieces are provided at the edges of the slot in the anvil seat and the cutting knife includes a V-shape outline such that when the cutting knife enters the slot on its cutting stroke, it defines with the anvil seat a progressively reducing opening between the cutting edge and the anvil pieces.

5. A wire rope cutter as claimed in claim 1 including a keying pin extending between the piston and rod for preventing relative rotation therebetween whereby the guide rod and keying pin maintain the piston against rotation and the piston is maintained and guided in its path of reciprocation within the cylinder.

* * * * *